July 11, 1967  C. FARO ET AL  3,330,211
DUAL PUMP APPARATUS
Filed Aug. 12, 1964
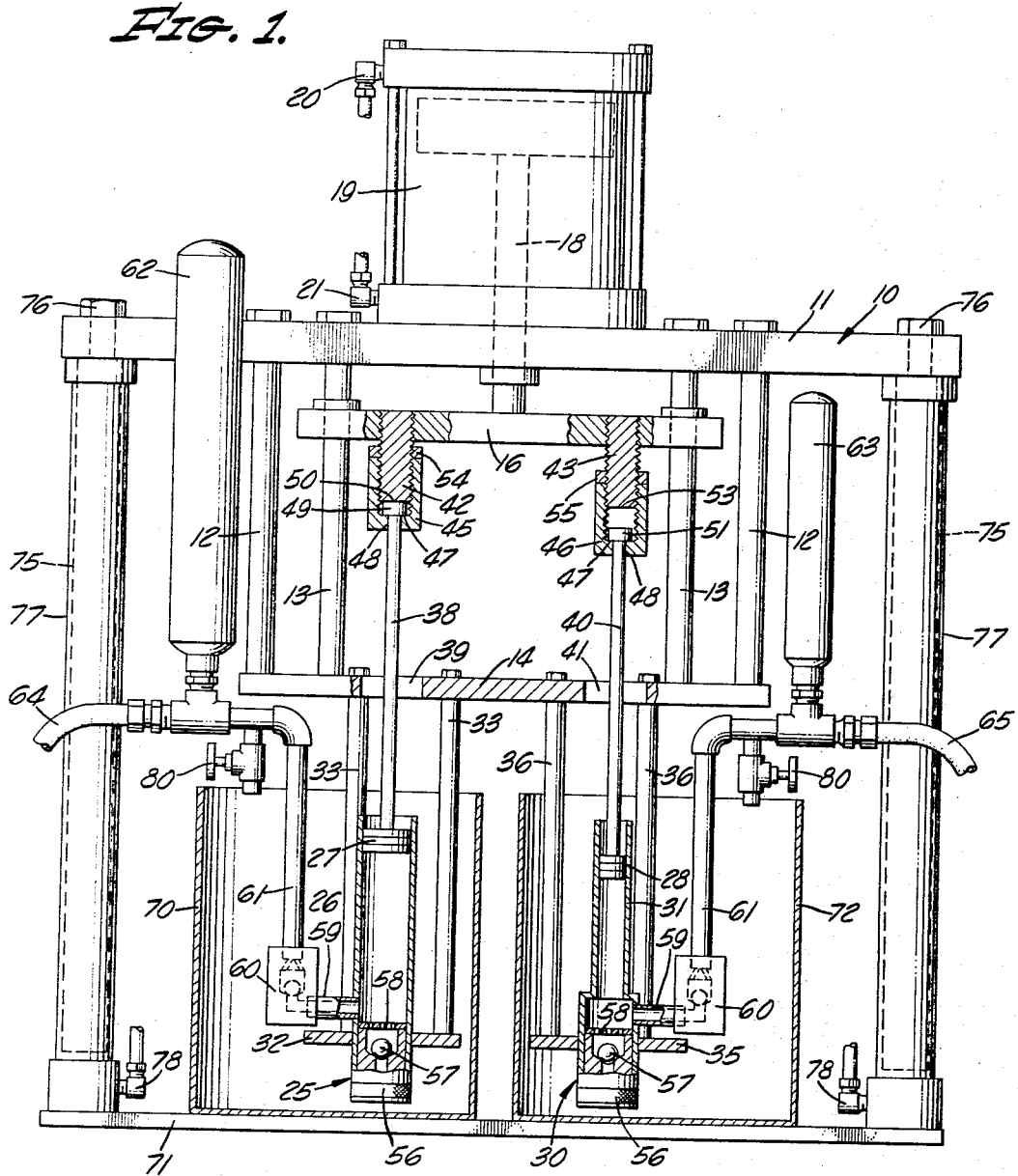
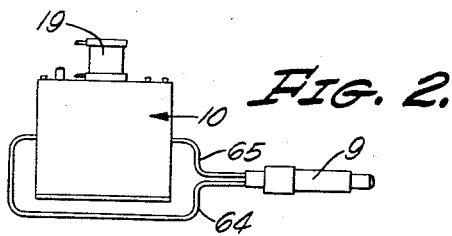
CHARLES FARO
JAMES H. CANTRELL
INVENTORS.
BY Lyon & Lyon
ATTORNEYS ns Patent Office  3,330,211
Patented July 11, 1967

3,330,211
DUAL PUMP APPARATUS
Charles Faro and James H. Cantrell, Riverside, Calif., assignors to The Flintkote Company, New York, N.Y., a corporation of Massachusetts
Filed Aug. 12, 1964, Ser. No. 389,175
2 Claims. (Cl. 103—6)

This invention relates to apparatus for simultaneously pumping two liquids in proportions which may be accurately regulated. This invention finds particular usefulness in connection with the delivery of two liquid components which will polymerize when mixed together.

It is an important object of this invention to provide such a device having novel apparatus for changing the relative proportions of the liquids being pumped.

Another object of this invention is to provide apparatus for simultaneously pumping of two liquids for delivery to a mixing and spraying apparatus of the general type shown in our copending application, Ser. No. 389,174, now Patent No. 3,304,010, filed concurrently herewith.

When a polymerizable liquid material, for example, tolylene diisocyanate, is to be mixed with a liquid base material or copolymer, for example, hydroxyl-rich polyester, to produce polyurethane, it is desirable to provide close control on the relative proportions of the two liquid components in order to achieve optimum results. Since the optimum ratios of the two components vary with ambient temperature and with other factors, it is important to provide a means for regulating the proportions within narrow limits, while maintaining the two liquid components separate until they reach the mixing device.

Other and more detailed objects and advantages will appear hereinafter.

In the drawings:

FIGURE 1 is a side elevation partly in section showing a preferred embodiment of our invention.

FIGURE 2 is a schematic diagram showing how two separate liquid component streams are delivered from the pumping device to the mixing device.

Referring to the drawings, the frame 10 includes an upper platform 11 connected by a plurality of columns 12 and guidebars 13 to the lower platform 14. A crosshead 16 is mounted to slide vertically on the guidebars 13, and this crosshead is reciprocated by the piston rod 18 of the power cylinder assembly 19 fixed to the platform 11. Alternate injection and exhaust of fluid under pressure through the fittings 20 and 21 serves to reciprocate the crosshead vertically with respect to the frame 10.

A first pump assembly 25 includes a cylinder 26 which slidably receives the piston 27. Similarly, a second pump assembly 30 includes a cylinder 31 which slidably receives the piston 28. The pump cylinder 26 is fixed to the frame 10 by means of the support ring 32 and rods 33 connected to the platform 14. Similarly, the pump cylinder 31 is fixed to the frame 10 by means of the ring 35 and the rods 36 which are fixed to the platform 14. Piston rod 38 is fixed to the piston 27 and extends through an aperture 39 provided in the platform 14. Similarly, piston rod 40 is fixed to the piston 28 and extends through aperture 41 in the platform 14.

Lost-motion connection means are provided for connecting the piston rods 38 and 40 in driving relationship with the reciprocating crosshead 16, and, as shown in the drawings, this means includes threaded studs 42 and 43, each fixed to the crosshead 16 and projecting downward therefrom. Internally threaded collars 45 and 46 receive the externally threaded studs 42 and 43, respectively, and each is provided with a shoulder 47 and a central aperture 48. The piston rod 38 is slidably received in the aperture 48 of the collar 45 and is provided with an integral enlargement 49 on its upper end confined between the shoulder 47 and the lower end 50 of the stud 42. Similarly, the piston rod 40 is slidably received in the aperture 48 of the collar 46 and is provided with an integral enlargement 51, which is confined between the shoulder 47 and the lower end 53 of the stud 43. A lock nut 54 serves to fix the collar 45 in adjusted position on the stud 42, and a lock nut 55 serves to fix the collar 46 in adjusted position on the stud 43.

In the position of the parts as shown in the drawing, the enlargement 49 of the piston rod 38 is clamped rigidly between the shoulder 47 and the lower end 50 of the stud 42, and, consequently, the piston 27 reciprocates through the same stroke as the crosshead 16. However, the enlargement 51 on the piston rod 40 is not solidly clamped between the shoulder 47 and the lower end 53 of the stud 43, but is permitted a limited amount of relative axial movement. This relative axial movement, or lost motion, causes the piston rod 40 and the piston 28 to move through a shorter stroke than that of the crosshead 16.

From the above description, it will be understood that the collars 45 and 46 may be adjusted so that either or both of the pump pistons 27 and 28 are given the same axial travel as the crosshead 16 or that the axial travel of either or both may be made somewhat less than that of the crosshead 16. In practice, one of the collars 45 or 46 is adjusted to remove all lost motion between its piston rod and the crosshead 16, while the other collar is adjusted to provide a lost-motion connection between the other piston rod and the crosshead 16. The amount of the lost motion is adjusted to produce accurately the desired proportion of liquids pumped by the first and second pumps 25 and 30.

Each of the pumps 25 and 30 is provided with a screened inlet 56, which communicates by way of ball check valve 57 and ball retainer 58 to the pump chamber within which the piston reciprocates. Also connected to the pump chamber of each pump is a discharge pipe 59. A check valve assembly 60 and outlet pipe 61 are connected to each of the discharge pipes 59. A surge chamber 62 is connected to the outlet pipe 61 for the pump 25, and a surge chamber 63 is connected to the outlet pipe 61 for the pump 30. A liquid delivered by the pump 25 passes through the outlet pipe 61 and through the discharge hose 64, and liquid from the outlet pipe 61 of the pump 30 passes through the discharge hose 65.

Liquid to be pumped by the pump 25, for example, tolylene diisocyanate, is contained in the open-top container 70, resting on the base 71, and liquid to be pumped by the pump 30, for example, hydroxel-rich polyester, is contained in open-top container 72, resting on the base 71. In order to install the liquid containers 70 and 72 on the base 71, means are provided for elevating the frame 10 and pumps 25 and 30 with respect to the base 71. As shown in the drawings, this means includes a pair of plungers 75, secured to the frame 10 by fastener element 76 and slidably mounted within tubular cylinder 77 fixed at their lower ends to the base 71. Fluid pressure admitted through fittings 78 serves to lift the plunger 75 with respect to the cylinder 77, thereby elevating the frame 10 with respect to the base 71. When the frame 10 is in its elevated position, the liquid containers 70 and 72 may be moved laterally into place on the base 71 by sliding under the lower projecting ends of the pumps at 25 and 30.

Valves 80 are provided on the outlet pipes 61 so that liquid delivered by the pumps may be returned to the containers 70 or 72, if desired. In normal operation, the valves 80 are closed.

In operation, the frame 10 is elevated away from the base 71 so that containers 70 and 72 with two separate liquids may be moved laterally into position on the base 71. The frame 10 is then lowered to bring the pumps 25 and 30 down into the interior of the liquid containers 70 and 72, respectively. The screened inlets 56 for the pumps are positioned just above the bottoms of the containers 70 and 72 and are submerged below the liquid level therein. The power cylinder assembly 19 is then actuated to effect reciprocation of the crosshead 16, thereby reciprocating the piston rods 38 and 40 of the pumps 25 and 30, respectively. Pump 25 then discharges liquid from the container 70 through outlet hose 64, and pump 30 discharges liquid from the container 72 through the discharge hose 65. The hoses 64 and 65 deliver the pumped liquids to the mixing device 9 in the desired proportions.

If the collars 45 and 46 are adjusted so that neither piston rod 38 nor 40 has any relative axial movement with respect to the reciprocating crosshead 16, the proportions of liquids delivered to the mixing device 9 is determined solely by the relative diameters of the pump cylinders 26 and 31. However, if it is desired to change this proportion slightly, either or both of the collars 45 and 46 may be adjusted to provide a lost-motion connection between the piston rods and the crossheads 16. Thus, as an example, a smaller proportion of liquid from the container 72 may be delivered by adjusting the position of the collar 46 with respect to the stud 43, so that the clearance space between the shoulder 47 and the lower end 53 of the stud 43 is greater than the axial thickness of the enlargement 51, thereby providing a lost-motion connection. The greater the extent of this lost motion, the greater is the reduction in volume of fluid delivered by the pump 30.

Having fully described our invention, it is to be understood that we are not to be limited to the details herein set forth, but that our invention is of the full scope of the appended claims.

We claim:

1. In a device for simultaneous pumping of two liquids, the combination of a frame, a first pump including a cylinder and a piston mounted for reciprocation therein, a second pump including a cylinder and a piston mounted for reciprocation therein, means fixing the cylinder of each pump relative to said frame, a crosshead guided on said frame for reciprocation, means connecting said crosshead to drive the piston of each pump, said means including a lost-motion connection between the crosshead and each of said pistons, respectively, and power means on the frame to reciprocate said crosshead.

2. In a device for simultaneous pumping of two liquids, the combination of a stationary base adapted to support liquid containers, a frame mounted for vertical movement on the base, a first pump including a first cylinder member and a first piston member mounted for relative reciprocation, a second pump including a second cylinder member and a second piston member mounted for relative reciprocation, means fixing one member of each pump relative to said frame, a crosshead guided on said frame for reciprocation, means connecting said crosshead to drive the other member of each pump, said means including a lost-motion connection between the crosshead and at least one of said other members, power means on the frame to reciprocate said crosshead, each pump having an inlet, and means for lowering the frame relative to the base to bring each pump inlet into a liquid container on the base.

References Cited

UNITED STATES PATENTS

| | | | |
|---|---|---|---|
| 712,028 | 10/1902 | Werner | 103—38 |
| 949,681 | 2/1910 | Krogh | 103—6 |
| 997,891 | 7/1911 | Allen | 103—6 |
| 1,428,181 | 9/1922 | Myers | 103—6 |
| 1,980,984 | 11/1934 | Davis | 103—4 |
| 2,345,693 | 4/1944 | Wilson | 103—44 |
| 2,925,780 | 2/1960 | Tear | 103—38 |
| 2,929,253 | 3/1960 | Baldelli | 103—38 |
| 3,072,462 | 1/1963 | Anderson | 103—6 |
| 3,196,802 | 7/1965 | Matheny | 103—38 |

FOREIGN PATENTS

| | | |
|---|---|---|
| 735,308 | 5/1943 | Germany. |
| 12,004 | 8/1902 | Great Britain. |

ROBERT M. WALKER, *Primary Examiner.*

LAURENCE V. EFNER, *Examiner.*